(12) United States Patent
Thoma et al.

(10) Patent No.: US 8,814,432 B2
(45) Date of Patent: Aug. 26, 2014

(54) SEAL-BEARING ASSEMBLY

(71) Applicants: Lynne A. Thoma, Easthampton, MA (US); Mark R. Wilkinson, Huntington, MA (US)

(72) Inventors: Lynne A. Thoma, Easthampton, MA (US); Mark R. Wilkinson, Huntington, MA (US)

(73) Assignee: Seal-Ryt Corporation, Westfield, MA (US)

( * ) Notice: Subject to any disclaimer, the term of this patent is extended or adjusted under 35 U.S.C. 154(b) by 0 days.

(21) Appl. No.: 13/799,797

(22) Filed: Mar. 13, 2013

(65) Prior Publication Data

US 2014/0105527 A1    Apr. 17, 2014

Related U.S. Application Data

(60) Provisional application No. 61/614,914, filed on Mar. 23, 2012.

(51) Int. Cl.
*F16C 33/74* (2006.01)
*F16C 17/12* (2006.01)
*F16J 15/30* (2006.01)

(52) U.S. Cl.
CPC ..................................... *F16C 17/12* (2013.01)
USPC ............. 384/16; 384/130; 384/152; 277/342; 277/510

(58) Field of Classification Search
USPC ........... 384/130, 322, 477, 483, 909, 911, 16, 384/152; 277/300, 311, 329, 338, 342, 362, 277/467, 510, 520, 534, 537
See application file for complete search history.

(56) References Cited

U.S. PATENT DOCUMENTS

| | | | | |
|---|---|---|---|---|
| 1,925,335 A | * | 9/1933 | Murphy | 285/94 |
| 2,199,735 A | * | 5/1940 | Beckman | 277/329 |
| 3,439,376 A | | 4/1969 | Nelson et al. | |
| 3,443,486 A | * | 5/1969 | Lanman | 92/244 |
| 3,474,734 A | * | 10/1969 | Stogner | 277/513 |
| 3,643,964 A | * | 2/1972 | Snelling et al. | 277/505 |
| 3,646,846 A | | 3/1972 | Houghton et al. | |
| 3,920,287 A | | 11/1975 | Jamin | |
| 4,054,331 A | | 10/1977 | Jamin | |
| 4,298,207 A | | 11/1981 | Hopper et al. | |
| 4,345,766 A | * | 8/1982 | Turanyi | 277/329 |
| 4,353,388 A | * | 10/1982 | Isoyama et al. | 277/516 |

(Continued)

FOREIGN PATENT DOCUMENTS

| | | | | | |
|---|---|---|---|---|---|
| EP | | 0779460 A1 | * | 6/1997 | F16K 41/02 |
| EP | | 1065674 A2 | * | 1/2001 | H01B 7/04 |

(Continued)

*Primary Examiner* — Marcus Charles
(74) *Attorney, Agent, or Firm* — Michael I. Wolfson; William H. Dippert

(57) ABSTRACT

A seal-bearing assembly to be inserted into the seal cavity of a mechanical device to provide a seal and a bearing surface to eliminate whip in a rotating and/or reciprocal cylindrical member. The seal-bearing assembly is particularly well suited for use in a reciprocal pump and between the steam lance and fixed steam tube in a sootblower. The assembly includes at least a pair of outer substantially rigid cylindrical bearings having an inner bore to be positioned over the cylindrical member and at least one complimentary flexible textile packing ring disposed between the two outer bearing members. In assemblies including an additional bearing, it is surrounded by at least one flexible packing on each side. The inner bore of the bearing members provide a bearing surface for eliminating whip of the moving elements in the device.

15 Claims, 3 Drawing Sheets

(56) References Cited

U.S. PATENT DOCUMENTS

| | | | |
|---|---|---|---|
| 4,371,180 A | 2/1983 | Case et al. | |
| 4,408,769 A * | 10/1983 | Wolff | 277/504 |
| 4,431,698 A | 2/1984 | Case et al. | |
| 4,548,265 A * | 10/1985 | Luke | 166/140 |
| 4,559,862 A | 12/1985 | Case et al. | |
| 4,582,329 A * | 4/1986 | Stalph | 277/506 |
| 4,583,496 A | 4/1986 | Albers et al. | |
| 4,718,780 A * | 1/1988 | Trudeau | 384/206 |
| 5,058,668 A * | 10/1991 | Newton | 277/329 |
| 5,090,087 A | 2/1992 | Hipple et al. | |
| 5,217,068 A * | 6/1993 | Newton | 277/329 |
| 5,225,262 A | 7/1993 | Leduc | |
| 5,267,533 A | 12/1993 | Smith | |
| 5,277,153 A | 1/1994 | Kakabaker | |
| 5,333,883 A * | 8/1994 | Piper et al. | 277/529 |
| 5,370,405 A | 12/1994 | Ueda | |
| 5,370,926 A * | 12/1994 | Hopper | 442/307 |
| 5,549,305 A | 8/1996 | Freund | |
| 5,636,688 A * | 6/1997 | Bassinger | 277/329 |
| 6,382,633 B1 * | 5/2002 | Hashiguchi et al. | 277/516 |
| 6,385,956 B1 | 5/2002 | Öttinger et al. | |
| 6,502,382 B1 | 1/2003 | Fujiwara et al. | |
| 6,575,122 B2 | 6/2003 | Hipple | |
| 6,644,007 B2 | 11/2003 | Fujiwara et al. | |
| 6,834,862 B2 | 12/2004 | Wilkinson | |
| 7,011,312 B2 * | 3/2006 | Ishida | 277/342 |
| 7,753,339 B2 | 7/2010 | Yuzawa et al. | |
| 2002/0155304 A1 | 10/2002 | Tanaka et al. | |
| 2007/0230846 A1 | 10/2007 | Tanaka et al. | |
| 2012/0292550 A1 * | 11/2012 | Meek | 251/359 |
| 2012/0301061 A1 | 11/2012 | Forrest | |

FOREIGN PATENT DOCUMENTS

| | | | |
|---|---|---|---|
| FR | 1492671 A * | 2/1969 | |
| GB | 1166253 A * | 10/1969 | F16C 33/04 |
| JP | 05068876 A * | 3/1993 | B01J 19/32 |
| JP | 2003193083 A * | 7/2003 | F16C 33/20 |

* cited by examiner

SEAL-BEARING ASSEMBLY

CROSS-REFERENCE TO RELATED APPLICATION

This application is based upon and claims the benefit of the filing date of commonly owned U.S. Provisional Patent Application Ser. No. 61/614,914, filed Mar. 23, 2012, which is incorporated herein by reference in its entirety.

FIELD OF THE INVENTION

This invention relates to an improved sealing and bearing assembly for mechanical devices requiring a shaft seal and bearing support. More particularly, this invention relates to an improved seal-bearing assembly, which permits rotational and axial movement and is positioned in a seal cavity or stuffing box of a mechanical device such as a reciprocating pump or a sootblower.

BACKGROUND OF THE INVENTION

In mechanical devices, such as pumps driven by a shaft connected to a motor or other means to move fluids, the shaft passes through a seal cavity, or a "stuffing box," defined by a cylindrical cavity in the device housing. The shaft is supported by bearings at the motor end. A seal and packing rings are placed in the stuffing box to engage the shaft to prevent fluid from passing through the seal cavity and reaching the bearings and the motor, causing damage to both. It is important that appropriate packing material is placed within the seal cavity. Also, after extended use, a shaft such as a pump shaft may develop whip as the bearings wear. Thus, it is highly desirable to provide a sealing system that provides an effective seal and an additional bearing surface to reduce the whip that can occur as the shaft rotates.

In fossil fuel burning power plants and similar boilers, soot deposits collect on the heat transfer pipes, and buildup of such deposits can seriously interfere with proper heat transfer efficiency. Such power plants and boilers are provided with sootblower assemblies to clean soot from the exterior of the heat transfer pipes. Such assemblies typically include an elongate hollow tubular lance which has steam or air discharge nozzles adjacent the leading end of the tubular lance, which tubular lance is moved inward into the heat transfer chamber in generally parallel relationship to one or more adjacent heat transfer pipes to eject steam or air against these pipes to dislodge the soot therefrom. (Reference herein to steam is intended to include steam, air or any fluid used to clean the heat exchanger pipes.) The tubular lance in turn is rotatably and axially slidably supported on an elongated and cantilevered stationary steam supply pipe which projects coaxially into the tubular lance. A packing assembly cooperates between the tubular lance and a steam supply pipe to create a sealed relationship therebetween, while at the same time permitting the tubular lance to be axially and rotatably advanced into the heat exchange chamber when removal of soot is desired. Each power plant or boiler typically has a large number of such soot removal, or "sootblower", devices. The tubular lance of each device must be cantilevered inwardly and moved a significant distance, perhaps as much as 40 feet.

Conventional sootblowers employ a plurality of packings in a seal cavity, or stuffing box, disposed axially adjacent one another for cooperation between the lance and the steam supply pipe. See, for example, U.S. Pat. Nos. 4,583,496, 5,277,153, and 6,575,122, incorporated herein by reference. These packings are able to withstand the high temperature of the steam under pressure, which is typically supplied at a temperature of about 600° F. or higher. However, inasmuch as the sootblowers are activated only periodically, such as once over an interval of several hours, the overall sootblower apparatus experiences severe differential thermal expansion characteristics when activated due to significant temperature changes when superheated steam is supplied. This makes sealing of the lance about the steam supply tube in a seal cavity or stuffing box, while still permitting relative axial and rotary movement therebetween, difficult.

While packings in sootblowers have been used with at least some success, nevertheless, packings do present disadvantages. It has been observed that use of packings in a seal cavity or stuffing box in an environment where sootblowers are used requires constant adjustment in the packing compression to achieve a proper seal while still permitting relative movement between the lance and steam supply pipe. If the packing compression is too low, then leakage occurs, and, conversely, if the compression is too high, then proper movement of the lance is difficult to achieve. Also, it has been noticed that the packings cause undesirable wear on the steam supply tube due to the significant compression required of the packing to achieve a desired seal.

Even though there are recognized disadvantages in the use of packings in sootblowers and reciprocal pumps, nevertheless, such packings have been used for many years and continue to be used in this environment in view of the lack of other satisfactory solutions. Thus, there is a need for sealing materials that provide an improved bearing surface and sealing environment for sootblowers, reciprocal pumps and other uses and that are chemically and heat resistant. Accordingly, it is desirable to provide an improved shaft seal-bearing assembly for use in the seal cavity or stuffing box of sootblowers and reciprocal pumps to provide an improved bearing surface and seal.

SUMMARY OF THE INVENTION

Generally speaking, in accordance with the invention, a shaft seal-bearing assembly for use in the stuffing box of a mechanical device having a cylindrical member driven by a motor is provided. The assembly includes a pair of outer substantially rigid cylindrical bearings having an inner bore to be positioned over the cylindrical member and at least one complimentary flexible packing ring disposed between the two outer bearings. The inner bores of the bearings provide a bearing surface for eliminating whip of the moving elements in the device. The shaft seal-bearing assembly is suitable for use in a reciprocating or reciprocating and rotating device and preferably includes at least two outer bearings dimensioned to occupy the cross-section between the inner bore of the device casing and a moveable shaft in a reciprocating pump or the outer wall of a stationary steam feed tube in a sootblower. At least one flexible packing ring is placed between the two outer bearings.

In reciprocating pumps, a shaft has only axial movement and generally operates at higher pressures than rotary pumps, sometimes up to 10,000 psi. The first outer bearing of a two-bearing system is installed at the bottom of the stuffing box and sees the highest pressure first. However, due to the clearance some of the system pressure affects the adjacent textile ring. As the function of the bearings is both to seal and bear, they must remain dimensionally stable in order to remain in intimate contact with the shaft. The bearings must not change in geometry in any way so they can completely block incoming pressure.

Sootblowers, on the other hand, incorporate helical, that is, rotational and axial, movement of the lance and uniquely have a motion, which is a slow rotation of the lance while it moves in and out axially. This movement is coupled with, potentially, an extreme lance "overhang", often up to 40 feet in length. This can cause a high radial load on the sealing materials within the stuffing box. The most effective way to reduce the radial load is to use two outer bearings in the stuffing box. The bearings are spaced apart as far as possible with compatible flexible packing between the bearings to minimize or eliminate a fulcrum effect.

Equipment which, by design, incorporates longer than normal shafts and/or heavier end components often requires greater shaft support. When stuffing boxes are deep enough to accommodate such support, it may be beneficial to utilize more than the two outer bearings. For example, the assembly could include a middle bearing with compatible flexible packing between the middle bearing and each outer bearing. Thus, each bearing is adjacent to at least one packing ring and at least one packing ring is between pairs of bearings. In this case the overall depth of the stuffing box determines the number of bearing elements that can be included.

Adding additional bearings, each one abutted by at least one textile packing or sealing ring, adds both greater load-bearing capability as well as greater sealing surface presented. Having two outer bearings reduces the cantilever effect thereby limiting the potential for shaft breakage and bearing fracture. It is within the scope of the invention that a stuffing box or shaft seal-bearing assembly may comprise more than two bearings, for example, from 3 to 5, with at least one packing ring between each grouping of two bearings. Reciprocating shafts impart "side load" on the packing rings, a direction in which braided rings are not designed to operate. It is imperative that each ring remains square and does not deform in any quadrant of its cross-section.

Accordingly, it is an object of the invention to provide an improved shaft sealing-bearing assembly to be inserted into the seal cavity or stuffing box of a reciprocating pump or sootblower.

It is also an object of the invention to provide an improved shaft sealing bearing assembly for use in the stuffing boxes of reciprocating devices, such as piston pumps, and reciprocating and rotating devices, such as lance pipes or tubes in rotary sootblowers.

It is a further object of the invention to provide an improved shaft sealing bearing assembly for a reciprocating pump, including at least one packing ring formed from chemical- or abrasion-resistant fibers disposed between two bearing rings or elements.

It is another object of the invention to provide an improved shaft sealing bearing assembly for a rotary sootblower, wherein one or both of two outer bearings are formed from a high temperature polymeric material.

It is yet a further object of the invention to provide an improved shaft sealing bearing assembly for a rotary sootblower, wherein one or both of two outer bearings are formed from a high temperature imidazole material.

It is yet another object of the invention to provide an improved shaft sealing bearing assembly for a rotary sootblower, wherein one or both of two outer bearings are formed from a high temperature polybenzimidazole material.

In one aspect of the invention, a shaft seal-bearing assembly for a mechanical device having reciprocating or reciprocating and rotational movement comprises:

a first outer cylindrical bearing;

at least one cylindrical textile packing member adjacent to the first outer cylindrical bearing; and a second outer cylindrical bearing oppositely adjacent to the at least one textile packing member.

In another aspect of the invention, at least one packing member is formed from chemical-resistant organic fiber.

In another aspect of the invention, the at least one packing member or members comprise material selected from the group consisting of carbonized yarns, graphitized yarns, exfoliated graphite yarns, ceramic yarns, and glass yarns.

In another aspect of the invention, a stuffing box assembly for sealingly attaching a lance tube to a steam feed tube in a sootblower seal cavity having a bore defined by an annular wall, comprises:

a first sleeve bearing and a second sleeve bearing oriented to be axially aligned with the bore and each other and spaced apart within the bore to define a packing space;

a plurality of braided packings, each braided packing being situated within the packing space and oriented to be axially aligned with each of the first and second sleeve bearings; and a gland follower inserted within the bore in opposed relation to the annular wall of the seal cavity, the gland follower being likewise axially aligned and bearing against the first sleeve bearing with an axial force to narrow the packing space, urging the plurality of braided packings to expand radially, such that when a lance tube is inserted axially, axial force will cause the braided packings to sealingly engage the lance tube.

In another aspect of the invention, in a lance tube stuffing box assembly for sealingly attaching a lance tube to a steam feed tube in a sootblower, the stuffing box assembly comprises:

within a seal cavity, a bore defined by an annular wall, a first sleeve bearing and a second sleeve bearing oriented to be axially aligned with the bore and each other and spaced apart within the bore to define a packing space;

a plurality of braided packings, each braided packing being situated within the packing space and oriented to be axially aligned with each of the first and second sleeve bearings; and a gland follower inserted within the bore in opposed relation to the annular wall of the seal cavity, the gland follower being likewise axially aligned and bearing against the first bearing with an axial force to narrow the packing space, urging the plurality of braided packings to expand radially, such that when a lance tube is inserted axially, the axial force will cause the braided packings to sealingly engage the lance tube.

In another aspect of the invention, the braided packings comprise polybenzimidazole fiber.

In another aspect of the invention, the plurality of braided packings are three or more braided packings.

In another aspect of the invention, each of the plurality of braided packings form a first annular cylinder defined by braided packings inner and outer radii and the sleeve bearings define a second annular cylinder having an inner radius that is approximately equal to the braided packings inner radius and having an outer radius that is approximately equal to the braided packings outer radius.

In another aspect of the invention, a method for sealingly engaging a lance tube with a steam feed tube in a sootblower comprises:

inserting into a cylindrical seal cavity having an annular wall a second sleeve bearing arranged coaxially with the seal cavity;

inserting a plurality of braided packings configured as annular cylinders, arranged coaxially with the seal cavity and the second sleeve bearing;

inserting a first sleeve bearing arranged coaxially with the seal cavity, the braided packings, and the second sleeve bearing, the first bearing defining in cooperation with the second bearing a packing space; and inserting a gland follower to urge the first bearing into the packing space deforming the braided packings into sealing engagement with the lance tube and the steam feed tube.

In another aspect of a method of the invention, the first and second sleeve bearings and the braided packings have each of an inner radius and an outer radius and the inner radii of the sleeve bearings and the braided packings are approximately equal.

In another aspect of a method of the invention, the outer radius of the sleeve bearings and the braided packings are approximately equal.

In another aspect of the invention, in a bearing apparatus for a lance tube stuffing box assembly for sealingly attaching a lance tube to a steam feed tube in a sootblower, the bearing assembly comprises:

within a seal cavity having a bore defined by an annular wall, a first sleeve bearing oriented to be axially aligned with the bore and bearing against a cavity wall both axially against a cavity floor and radially at its outer circumference against the bore, the bearing defining an inner surface to receive the lance tube in rotating engagement, the cavity floor being situated opposite a gland follower;

a packing space, configured to receive a plurality of braided packings, each braided packing being situated within the packing space and oriented to be axially aligned with the first sleeve bearing; and a second sleeve bearing, oriented to be axially aligned with the bore and bearing radially against the gland follower and radially at its outer circumference against the bore, the bearing defining an inner surface to receive the lance tube in rotating engagement, wherein the bearings are configured and spaced apart to support the lance tube and in use, the gland follower will exert an axial force on the second bearing to compress the packings between the bearings causing the packings to sealingly engage the lance tube.

In another aspect of the invention, each of the plurality of packings forms a first annular cylinder defined by the packings' inner and outer radii and the sleeve bearings define a second annular cylinder having an inner radius that is approximately equal to the packings' inner radius and having an outer radius that is approximately equal to the packings' outer radius.

In another aspect of the invention, the inner radius of the stuffing box assembly is 2.375 inches, an outer radius of the stuffing box assembly is 3.375 inches, and the length or distance from the outer surface of the first bearing to the outer surface of the second bearing is 4.625 inches.

The invention comprises a product possessing the features, properties, and the relation of components which will be exemplified in the product hereinafter described and the scope of the invention will be indicated in the claims.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWING

For a fuller understanding of the invention, reference is had to the following description taken in connection with the accompanying drawing, in which.

DETAILED DESCRIPTION OF THE INVENTION

Figure 1:
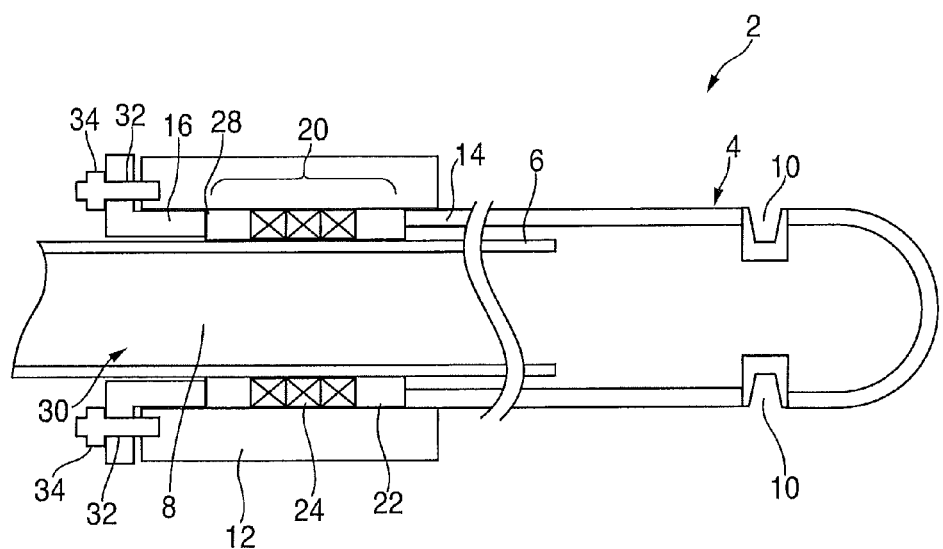
FIG. 1 is a partial cross-sectional view of the distal end a typical sootblower device with a seal cavity and a seal-bearing assembly installed in the seal cavity.

FIG. 1 is a partial sectional view of the distal end of a sootblower assembly 2 showing an outer tubular lance 4 coaxially positioned for displacement on a steam feed tube 6, wherein outer tubular lance 4 and steam feed tube 6 project into the heat exchange coils of a boiler. Steam feed tube 6 is coaxially positioned within assembly 2 and outer tubular lance 4, and steam from steam feed tube 6 exits outer tubular lance 4 at steam openings 10. A seal cavity or stuffing box 8 defined by a cylindrical outer casing wall 12 is positioned at the proximal end 14 of outer tubular lance 4 and is closed by a gland follower 16. A seal-bearing assembly 20 constructed and arranged in accordance with the invention is positioned within seal cavity 8. Assembly 20 includes a first distal outer bearing or bearing ring 22, flexible packing rings 24, and a second proximal outer bearing or bearing ring 28. The proximal end 30 of seal cavity 8 is defined by gland follower 16 mounted on fixed gland bolts 32 and secured in place by gland nuts 34.

A wide variety of seals and venting configurations are available to be placed in seal cavity or stuffing box 8 to restrict and limit entry of pumped fluid into seal cavity or stuffing box 8. If fluid enters seal cavity or stuffing box 8 and migrates from the distal outlet of outer tubular lance 4 or steam feed tube 6, the seals tend to wear and no longer provide a sealing and bearing effect. This causes outer tubular lance 4 to whip and to no longer maintain its axial displacement along steam feed tube 6. The packing rings 24 will be subject to substantial degradation due to corrosive action of high temperature steam.

A shaft seal-bearing assembly 20 in accordance with the invention for a mechanical device having reciprocating or reciprocating and rotational movement includes a first outer cylindrical bearing ring 22 at one end of stuffing box 8 with at least one cylindrical textile packing member 24 adjacent to outer cylindrical bearing ring 22 and a second outer cylindrical bearing ring 28 adjacent to the at least one cylindrical textile packing member. As shown in FIG. 1, preferably there are more than one or two cylindrical textile packing members included.

In a most preferred embodiment of the invention, a seal-bearing assembly 20 for a sootblower comprises a first cylindrical or annular outer bearing, two or more cylindrical or annular packing members, and then a second cylindrical or annular outer bearing. The materials and sizes are chosen to provide a proper seal while still permitting relative movement between the lance and the steam supply pipe. Moreover, the seal-bearing assembly must provide a proper bearing surface and sealing environment that are chemical- and heat-resistant. The materials useful for a sootblower assembly are also useful for use in a reciprocating pump.

The shaft-sealing assembly is intended to fit within a sealing cavity or stuffing box in a reciprocal pump or sootblower device. The sealing cavity or stuffing box comprises a bore defined by an annular wall. In one aspect of the invention, a first sleeve bearing and a second sleeve bearing are oriented to be axially aligned with the bore and each other and spaced apart within the bore to define a packing or packings space. A plurality of braided packings are situated within the packing space and oriented to be axially aligned with each of the first and second sleeve bearings. A gland follower is inserted within the bore in opposed relation to the annular wall of the seal cavity, and the gland follower is likewise axially aligned and bearing against the first sleeve bearing with an axial force to narrow the packing space, urging the plurality of braided packings to expand radially. When a lance tube is inserted axially, axial force will cause the braided packings to sealingly engage the lance tube.

Figure 2:
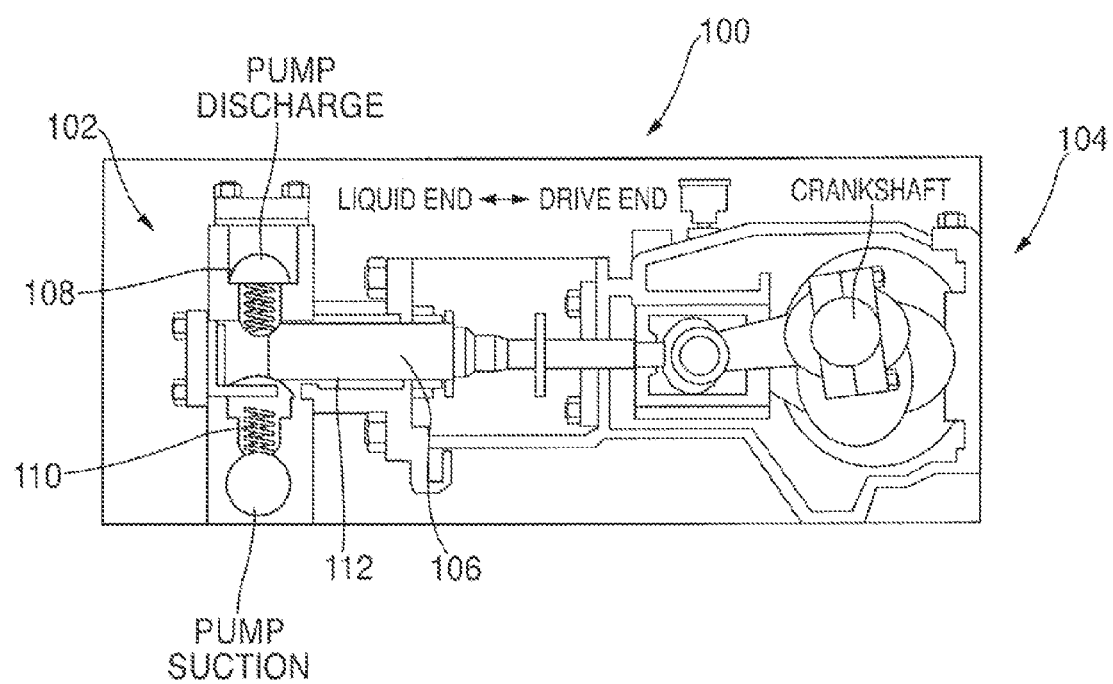
FIG. 2 is a sectional schematic view of a typical reciprocating pump.

FIG. 2. Illustrates a typical reciprocating positive displacement pump 100 having a liquid end 102 and a drive end 104. Liquid end 102 displaces a fixed volume of fluid for each stroke of drive end 104 that drives a shaft 106 in reciprocating fashion. Suction and discharge flow is usually determined by the position of check valves 108 and 110 that are opened and closed by the movement of shaft 106 through a stuffing box 112.

Figure 3:
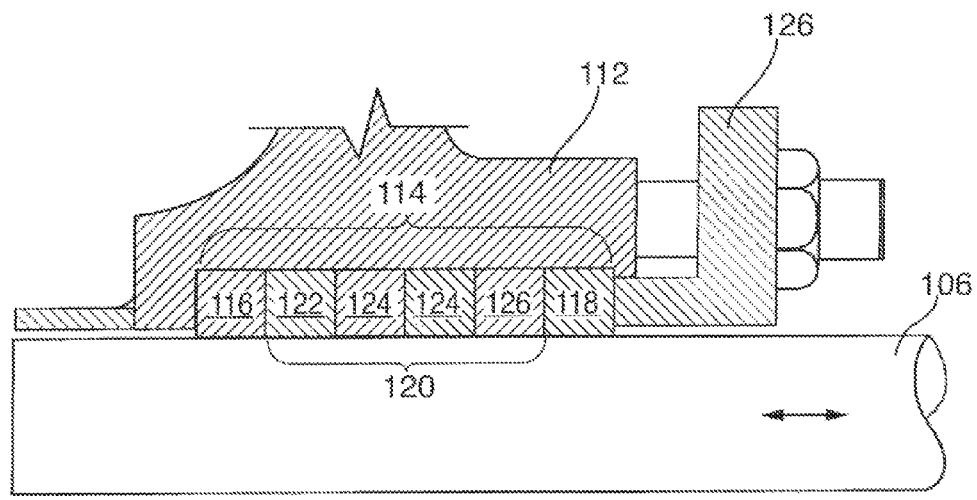
FIG. 3 is a partial sectional view of the stuffing box of a typical reciprocating pump showing the positioning of the bearings and packing.

FIG. 3 is a partial sectional view of stuffing box 112 suitable for use in a reciprocating pump for mining operations having a seal-bearing assembly constructed and arranged in accordance with the invention. Assembly 114 includes a first distal outer bearing 116 and a proximal outer bearing 118. In this embodiment five packing rings 120 are positioned between bearings 116 and 118. As discussed in detail in Example 1, packing 120 includes a lower all carbon fiber braided packing 122 adjacent to lower bearing 116 and two packing rings 124 of 50 percent PTFE-impregnated Aramid yarn/50 percent fiberglass, and an upper all carbon fiber braided packing 126 adjacent upper bearing 116. Seal-bearing assembly is held in position in stuffing box 112 and adjusted by securing a gland follower 126.

Figure 4:
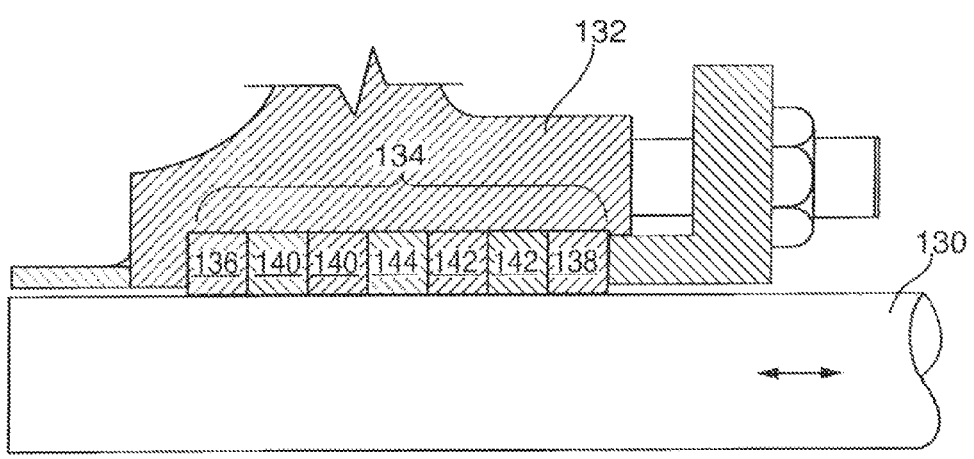
FIG. 4 is a partial sectional view of the stuffing box of a typical sootblower including a seal-bearing assembly with three bearings in accordance with the invention.

FIG. 4 is a partial sectional view of stuffing box 112 suitable for use in a pump with a shaft 130 having reciprocal and/or rotational movement and having a stuffing box 132 seal-bearing assembly 134 constructed and arranged in accordance with an embodiment of the invention. Assembly 134 includes a first distal outer bearing 136 and a proximal outer bearing 138. In this embodiment packing rings 140 are positioned adjacent distal bearing 136 and two packing rings are positioned adjacent proximal bearing 138. A third bearing 144 is positioned between the two pair of packings 140 and 142. This type of seal-bearing assembly is useful for those applications requiring additional bearing support to maintain shaft 130. Each bearing may be the same or of a different material and the same or different dimension.

Sootblowers are normally run with steam at about 700° F., and it is advantageous to use as packing materials appropriate polymers that will not only function at this elevated temperature but will also absorb just enough moisture to effect a slight swelling in the polymer, allowing it to approximate the shaft diameter and greatly aid in the sealing function as well. Textile selection is based upon those yarns which demonstrate the ability to remain fully viable at temperatures exceeding those experienced in this application, namely, carbonized yarns, graphitized yarns, exfoliated graphite yarns, ceramic yarns, glass yarns, etc. A necessary characteristic of these yarns is that they remain dimensionally stable through the axial/rotary action of the shaft. The most functional construction is to place high-tensile, low elongation to break carbonized yarns in the outer positions with softer graphitized yarns comprising the middle contact positions. Further use of the carbonized yarns in the core area of the packing aids in overall braid stability. Thus, in the combined axial/rotary movement of the shaft, the carbonized yarns act as wipers to trap any mechanical displacement of the graphitized or exfoliant yarns, keeping them in position to effect positive sealing.

In addition to chemical and thermal compatibility, all bearing materials or textiles used must have the characteristics of high tensile strength and low elongation to break. If the textiles used are not of the same yarn, they must be pre-twisted to ensure that the disparate yarns act in unison and provide a structure which will remain firmly in position. (See, for example, U.S. Pat. Nos. 4,298,207, 4,371,180, 4,431,698, 4,559,862, and 5,370,926, the contents of each of which are incorporated herein by reference in their entirety.) The resultant asymmetry provides a uniform, unchangeable density all across the axial plane of contact ensuring stability under severe axial movement and high incoming pressure. Textile packing rings may be of the same or different materials to conform to existing imperfections of the shaft or of highly heat-conductive materials to enable extreme gland follower loads. The outside bearing adds further shaft support to eliminate the fulcrum effect of having only one bearing in the stuffing box. Finally, this hard, close-clearance bearing prevents textile extrusion to the outside. The twin bearings, fore and aft, encapsulate the textile sealing materials, keeping them from movement.

Useful bearing material are those that provide suitable chemical, temperature, compressive strength, flexural strength and wear characteristics and can be appropriately machined to yield the desired bearing dimensions and tolerances. Such bearing materials include, but are not limited to polymers including polyphenylene sulfides, polyimidizoles, polyamideimides, polybenzylimidizoles, PEEK polymers obtained by step-growth polymerization by the dialkylation of bisphenolate salts, PTFE, perfluoroalkoxy, and formulations containing these polymers in a major proportion.

Useful packing materials are described in the aforementioned U.S. Pat. Nos. 4,298,207, 4,371,180, 4,431,698, 4,559, 862, and 5,370,926, the contents of each of which are incorporated herein by reference in their entirety. More particularly, useful materials include, but are not limited to, mechanically and/or thermally resilient component of graphite tape, expanded graphite foil, graphite fiber, carbon fiber, polybenzimidazole (PBI) fiber, PEK fiber, PEEK fiber, PFA fiber, aromatic polyamide fiber, Inconel or Monel wire, or combinations thereof. In another aspect of the invention, the at least one packing member is a material selected from the group consisting of carbonized yarns, graphitized yarns, exfoliated graphite yarns, ceramic yarns, and glass yarns. Tension or lip seal rings may comprise the same or different components of the same or different components. The packing rings or members may comprise mechanically and/or thermally components, whether individually or by combinations thereof, i.e., corner yarns, resilient core, etc. The designs and materials are chosen to resist packing consolidation.

In another embodiment of the invention, braided packing rings comprise fibers of flax, jute, asbestos, or a synthetic material, such as polytetrafluoroethylene, which fibers are formed into yarns or strands and which are braided together about core strands. The result is typically a packing having a square cross-section and herringbone weave pattern extending in an axial direction along the packing. Typical packing members are illustrated in U.S. Pat. No. 3,646,846, incorporated herein by reference.

Other exemplary embodiments of various braided packing are set forth in U.S. Pat. No. 5,225,262, incorporated herein by reference. As stated in this patent:

"The braided packing of the invention is suitable for high-temperature and high-pressure applications, with functional limits up to 1200° F. and 5,000 psi. The resilience and toughness of the packing is achieved through a flexible packing core of folded, reinforced square plait braided graphite tape overbraided with high strength and high-temperature resistant yarns. The resulting packing is rugged, non-hardening, non-metal, non-stem scoring, and easily removable (e.g., from a packing gland) when it needs to be replaced. The high-temperature/high-pressure resistant packing of the invention has the additional advantage of not requiring the use of asbestos and yet retaining the high-temperature resistant properties of that product. The inner core of the packing can be pre-consolidated to a density approaching the final density and therefore the final product can be live-loaded (e.g., into a valve stem packing gland), thus saving considerable time in the final adjustment of the gland."

Additional suitable packing materials are taught in U.S. Pat. No. 6,644,007, U.S. Pat. No. 6,502,382, and U.S. Pat. No. 6,385,956, each of which is incorporated herein by reference.

It is within the scope of the invention that there may be three or more braided packing rings between the two outer bearing rings.

Reciprocating shafts impart "side load" on the sealing rings, a direction which braided rings are not designed to operate in. It is imperative that each ring remains square and does not deform in any quadrant of its cross-section. With regard to the choice of materials, low elongation to break textiles keep the cross-section and entire matrix dimensionally stable.

In a preferred embodiment of the invention suitable for sootblowers, either or both of the packing members and the outer bearing rings comprise polybenzimidazole (PBI) as molded material or as fiber. PBI fiber was first derived in 1983 and is a synthetic fiber with an extremely high melting point that also does not readily ignite, because of its exceptional thermal and chemical stability. The Federal Trade Commission definition for PBI fiber is a "manufactured fiber in which the fiber-forming substance is a long chain aromatic polymer having recurring imidazole groups as an integral part of the polymer chain". When used as a fiber to make up a braided packing member, PBI demonstrates superior longevity and sealing capability. While PBI is one suitable constituent, it is not the only such suitable constituent of outer bearings or the braided packing members.

In addition to PBI, the outer bearing rings may comprise other materials that are substantially rigid and are impervious or resistant to corrosive fluids that may be transported by a pump or may come in contact with a tubular lance or a steam tube in a sootblower. Preferred materials include, but are not limited to, non-ferrous materials, molybdenum/carbon or glass filled thermoplastic material such as PTFE or other suitable polymeric materials.

In sootblowers, the outer bearing rings are configured as sleeve bearings but are useful herein to serve a novel, important, and nonobvious function in the stuffing box assembly 30. The outer bearing rings are spaced apart and provide support to a tubular lance, lending support to the whole of the tubular lance that is largely equivalent to that of a bearing that ran from an outer surface of a first outer bearing to that of an oppositely situated second outer bearing while preserving a space for the braided packing members between the outer bearings. Given the elongate arrangement of the tubular lance, should the center of gravity rest outside of a central point between the first and second outer bearings, the weight of the tubular lance imparts torque around the outer bearings. By their spaced apart configuration, the outer bearings can resist the torque being situated further apart on the lever arm, thereby obtaining a mechanical advantage as compared to the same bearings situated in touching relation. The spaced apart relation, therefore, prevents the torque from deflecting the tubular lance and, thereby compromising the sealing conformity of the braided packing members with the outer surface of the tubular lance. While a two bearing solution is described, these advantages are gained by at least the outer two bearings but might be enhanced by additional bearings at intervals throughout the braided packing members in the packing space.

Each of the plurality of braided packings may form a first annular cylinder defined by the braided packing's inner and outer radii, and the sleeve bearings may define a second annular cylinder having an inner radius that is approximately equal to the braided packing inner radius and having an outer radius that is approximately equal to the braided packing's outer radius.

The inner radius of the stuffing box assembly may be from about 1.00 to about 4.00 inches, preferably from about 1.50 to about 3.50 inches, and the outer radius of the stuffing box assembly may be from about 2.00 to about 5.00 inches, preferably from about 2.50 to about 4.50 inches. The distance or length from the outer surface of the first bearing to the outer surface of the second bearing is from about 3.75 to about 6.00 inches.

A method for sealingly engaging a lance tube with a steam feed tube in a sootblower comprises:

inserting into a cylindrical seal cavity having an annular wall a second sleeve bearing arranged coaxially with the seal cavity;

inserting a plurality of braided packings configured as annular cylinders, arranged coaxially with the seal cavity and the second sleeve bearing;

inserting a first sleeve bearing arranged coaxially with the seal cavity, the braided packings, and the second sleeve bearing, the first bearing defining in cooperation with the second bearing a packing space; and inserting a gland follower to urge the first bearing into the packing space deforming the braided packings into sealing engagement with the lance tube and the steam feed tube.

The first and second sleeve bearing and the braided packings have each of an inner radius and an outer radius and the inner radii of the sleeve bearings and the braided packings are approximately equal. The outer radius of the sleeve bearings and the braided packings are approximately equal.

In a bearing apparatus for a lance tube stuffing box assembly for sealingly attaching a lance tube to a steam feed tube in a sootblower, the bearing assembly comprises:

within a seal cavity having a bore defined by an annular wall, a first sleeve bearing oriented to be axially aligned with the bore and bearing against a cavity wall both axially against a cavity floor and radially at its outer circumference against the bore, the bearing defining an inner surface to receive the lance tube in rotating engagement, the cavity floor being situated opposite a gland follower; a packing space, configured to receive a plurality of braided packings, each braided packing being situated within the packing space and oriented to be axially aligned with the first sleeve bearing; a second sleeve bearing, oriented to be axially aligned with the bore and bearing radially against the gland follower and radially at its outer circumference against the bore, the bearing defining an inner surface to receive the lance tube in rotating engagement, wherein the bearings are configured and spaced apart to support the lance tube and in use, the gland follower will exert an axial force on the second bearing to compress the packings between the bearings causing the packings to sealingly engage the lance tube.

Each of the plurality of packings form a first annular cylinder defined by packings inner and outer radii and the sleeve bearings define a second annular cylinder having an inner radius that is approximately equal to the packings inner radius and having an outer radius that is approximately equal to the packings outer radius.

In another aspect of the invention, the inner radius of the stuffing box assembly is 2.375 inches, an outer radius of the stuffing box assembly is 3.375 inches, and the length or distance from the outer surface of the first bearing to the outer surface of the second bearing is 4.625 inches. Between the outer bearings there are pluralities of braided packing members that, in alternate embodiments include any of a composition used extensively in industry for a variety of sealing purposes.

A second but also important function of the outer bearings in cooperation with a gland follower 16 is to compress the braided packing members, deforming them radially in response to the compressive forces applied axially. Gland follower 16 is urged axially by the suitable torqueing of gland nuts 34 on gland bolts 32. Torque exerted on gland nuts 34 causes them to rotate. Because the inner radii of the outer bearings are approximately equal to those of the braided packing members and the outer radii of the outer bearings are approximately equal to the outer radii of the braided packing members (i.e., by approximately equal, the application requires less than ten percent difference between the radii of the uncompressed braided packing members and the outer bearings). The rotational motion is converted by the meshing of threads on gland nut 34 and gland bolts 32 to impart a linear motion axially inward, thus converting the torque to a linear force axially inward. In the described fashion, gland follower 24 exerts the compressive force on the braided packing members pressing them inward within the seal cavity into sealing engagement with the tubular lance.

When suitably assembled, the gland assembly engages tubular lance 4 and forms a suitable seal between it and steam feed tube 6, allowing tubular lance 4 to conduct high energy steam from steam feed tube 6 through tubular lance 4 to leave tubular lance tube 4 through any of several nozzles. As a result of the sealing engagement between the gland assembly and tubular lance 4, in operation, the sealing engagement can be so tight as to cause the gland assembly to move in axially and rotate with tubular lance 4 together as an integral assembly.

EXAMPLES

The following examples are set forth by way of illustration to help explain the invention, and are not intended to be limiting in any way.

Example 1

A bearing assembly in accordance with the invention suitable for use in a reciprocating device is prepared as follows. Such devices include a piston pump commonly used in the mining industry where slurries carrying abrasive rigid material are being transported. This abrasive material will dictate the type of bearing and packing used in the bearing assembly.

A typical stuffing box of a piston pump is 4.75 inches in depth with a casing having an inner bore of 3.25 inches and a piston shaft with a 2.50 inch diameter. Thus, the cross-section of the bearing assembly is 0.375 inch in length.

A 1.75 inch spring under tension is positioned at the upper end of the stuffing box. The assembly dimensions are 2.50" (i.d.)×3.25" (o.d.)/0.375" cross-section so that it fits into the annulus between the piston shaft and the inner bore of the stuffing box casing. The assembly includes a first bearing of an extended wear material, such as polyphenylene sulfide polymer compound 1.125 inches in length, packing and a second bearing on the piston end of the stuffing box 0.75 inches in length. A longer spring side bearing was selected due to the increased pressure on the lower bearing due to the spring. Alternatively, the two rigid bearings can be the same length. The bearings can also be formed of a polyamide/imide material for this end use.

Packing was selected to be abrasion resistant and include carbon fiber to impart structure to the assembly. Specifically, a first lower braided packing of all carbon fiber was positioned against the first lower bearing, two braided backings of 50 percent PTFE-impregnated Aramid yarn/50 percent fiberglass, and a second upper carbon fiber packing. Each packing element is typically 0.375 inches. When installed under tension, the length of the packing element of the bearing assembly is 1.125 inches providing an assembly 3.00 inches in length. Typically, the piston spring is 1.75 inches in length thereby filling a 4.75 inch seal cavity.

When installed in a piston pump transporting slurries containing solid ore particles, the bearing assembly of the two outer bearing elements and selected extended wear and carbon fiber material maintained its shape and the pump performed satisfactorily.

Example 2

A bearing assembly in accordance with the invention suitable for use in the stuffing box of a rotary and reciprocal device such as a soot blower is prepared as follows. Such devices include a horizontally elongate steam supply tube and a horizontally elongate steam discharge lance telescoped axially over the supply tube. Such devices generally operate at temperatures over 600° F.

A typical stuffing box of a rotary soot blower is 3.375 inches in length with a casing having an inner bore of 3.125 inches and an inner supply tube having an outside diameter of 2.375 inches. Thus, the cross-section of the device is 0.375 inches. The bearing assembly includes two outer bearing rings formed of a high temperature polybenzimidazole material with textile packing elements between the bearings.

The assembly includes two outer bearings of a high temperature polybenzimidazole material, each 0.875 inches in length. Packing is placed between the two bearings. The packing includes a first ring of carbon fiber packing, two rings of graphite helically braided with Inconel wire inside and over braided with carbon-inserted exfoliated graphite foil and a second ring of carbon fiber adjacent the second bearing.

Packing was selected to be resistant to the high temperature in the soot blower due to pressurized steam and include carbon fiber to impart structure to the assembly. When installed in the stuffing box, the length of the packing element of the bearing assembly is 1.500 inches.

When installed in a rotary soot blower, the bearing assembly of the two outer high temperature bearing elements and selected carbon fiber material maintained its shape and the soot blower performed satisfactorily.

It will thus be seen that the object set forth above, among those made apparent from the preceding description are efficiently attained and, since certain changes may be made in the device set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention, which, as a matter of language, may be said to fall there between.

What is claimed is:

1. A seal-bearing assembly for a mechanical device having a shaft with reciprocating movement comprising:
   a first substantially rigid high performance polymeric cylindrical outer bearing;
   a second substantially rigid high performance polymeric cylindrical outer bearing spaced apart from and axially aligned with the first outer bearing;
   at least one cylindrical textile packing member including carbon yarn adjacent to each of the first and second outer bearings; and
   at least one cylindrical textile packing member of one of a chemically resistant organic fiber and a high-temperature resistant organic fiber positioned between the carbon yarn packing members.

2. The seal-bearing assembly of claim 1, wherein the at least one additional cylindrical textile packing member between the packing members of carbon yarn includes chemically resistant organic fiber.

3. The seal-bearing assembly of claim 2, wherein both of the first and second outer bearings comprise polyphenylene sulfide, and at least one flexible cylindrical textile packing member includes PTFE impregnated aramid yarn and fiberglass between the carbon yarn packing members.

4. The seal-bearing assembly of claim 1, wherein at least one of the first and second outer bearings includes high-temperature polymeric material or a formulation thereof.

5. The seal-bearing assembly of claim 1, wherein the at least one cylindrical textile packing member between the packing members of carbon yarn includes a high-temperature resistant organic fiber.

6. The seal-bearing assembly of claim 1, wherein at least one of the first and second outer bearings includes a chemically resistant polymeric material or a formulation thereof.

7. The seal-bearing assembly of claim 1, wherein at least one cylindrical textile packing member is formed from a first carbon yarn flexible braided packing member disposed adjacent to the first outer bearing, a flexible cylindrical textile packing member comprising helical braided Inconel wire overbraided with carbon inserted exfoliated graphite foil is disposed adjacent to the carbon yarn packing member, a second carbon yarn flexible braided packing member is disposed adjacent to the helical braided Inconel wire packing member, and the second outer bearing is disposed adjacent to the second carbon yarn packing member.

8. The seal-bearing assembly of claim 1, wherein the polymeric material of the first and second outer bearings comprise a high-temperature polymeric material selected from the group consisting of polyphenylene sulfide, polyimidazoles, fluoropolymers, polyamideimides, polyether ether ketone polymers, and formulations thereof.

9. The seal-bearing assembly of claim 8, wherein the bearings include polybenzimidazole or a formulation thereof.

10. The seal-bearing assembly of claim 8, wherein both of the first and second outer bearings comprise polyimidazole, and at least one flexible cylindrical textile packing member includes polyimidazole and carbon yarn between the carbon yarn packing members.

11. The seal-bearing assembly of claim 1, wherein both of the first and second outer bearings comprise polybenzimidizole, and a first carbon yarn flexible braided packing member is disposed adjacent to the first outer bearing, a flexible cylindrical textile packing member including a helical braided Inconel wire overbraided with carbon inserted exfoliated graphite foil is disposed adjacent to the first carbon yarn packing member, a second carbon yarn flexible braided packing member is disposed adjacent to the helical braided Inconel wire packing member, and the second outer bearing is disposed adjacent to the second carbon yarn packing member.

12. The seal-bearing assembly of claim 11, further including a second helical braided Inconel wire packing member between the first Inconel packing member and one of the carbon yarn packing members.

13. The seal-bearing assembly of claim 1, wherein both of the first and second outer bearings comprise polybenzimidizole, and a first carbon yarn flexible braided packing member is disposed adjacent to the first outer bearing for the plunger end of a pump, a flexible cylindrical textile packing member including a helical braided Inconel wire overbraided with carbon inserted exfoliated graphite foil is disposed adjacent to the first carbon yarn flexible packing member, second and third carbon yarn flexible braided packing members are disposed adjacent to the helical braided Inconel wire packing member, and the second outer bearing is disposed adjacent to the second and third carbon yarn packing members at the spring end of the pump.

14. The seal-bearing assembly of claim 1, wherein the cylindrical textile packing material between the packing members of carbon yarn is selected from the group consisting of carbon yarns, graphitized yarns, exfoliated graphite yarns, ceramic yarns, and glass yarns.

15. The seal-bearing assembly of claim 1, wherein both of the first and second outer bearings comprise polyphenylene sulfide, a carbon yarn flexible braided packing member is disposed adjacent to each of the outer bearings, and at least one flexible cylindrical textile packing member of a helical braided Inconel wire overbraided with carbon inserted exfoliated graphite foil is disposed adjacent to and between the carbon yarn packing members.

* * * * *